(12) United States Patent
Saha

(10) Patent No.: US 9,963,367 B1
(45) Date of Patent: May 8, 2018

(54) FILTER CONTAINING CLEANED BURDOCK ROOT FOR PURIFYING DRINKING WATER

(71) Applicant: Anuj K. Saha, Martinez, GA (US)

(72) Inventor: Anuj K. Saha, Martinez, GA (US)

( * ) Notice: Subject to any disclaimer, the term of this patent is extended or adjusted under 35 U.S.C. 154(b) by 244 days.

(21) Appl. No.: 14/834,891

(22) Filed: Aug. 25, 2015

(51) Int. Cl.
*C02F 1/68* (2006.01)
*C02F 1/28* (2006.01)
(Continued)

(52) U.S. Cl.
CPC ............... *C02F 1/68* (2013.01); *C02F 1/286* (2013.01); *C02F 1/281* (2013.01); *C02F 1/283* (2013.01); *C02F 1/505* (2013.01); *C02F 9/00* (2013.01); *C02F 2101/006* (2013.01); *C02F 2101/103* (2013.01); *C02F 2101/12* (2013.01); *C02F 2101/14* (2013.01); *C02F 2101/163* (2013.01);
(Continued)

(58) Field of Classification Search
CPC .... C02F 1/001; C02F 1/286; C02F 2101/006; C02F 2101/103; C02F 2101/12; C02F 2101/14; C02F 2101/163; C02F 2101/20; C02F 2101/305; C02F 2101/363; C02F 2101/366; C02F 1/281; C02F 1/283; C02F 1/505; C02F 1/68; C02F 9/00
See application file for complete search history.

(56) References Cited

U.S. PATENT DOCUMENTS 5,043,072 A * 8/1991 Hitotsuyanagi ........ B01D 61/16
210/638
5,271,837 A * 12/1993 Discepolo ................ B01J 39/04
210/282
(Continued)

OTHER PUBLICATIONS

Snoeyink et al, Removal of Barium and Radium from Groundwater, Feb. 1987, United States Environmental Protection Agency, EPA/600/M-86/021, 8 pages [online], [Retrieved on Oct. 17, 2017]. Retrieved from the internet URL: https://www.orau.org/ptp/PTP%20Library/library/Subject/Radium/remediation%20water.pdf>.*

(Continued)

*Primary Examiner* — Matthew O Savage
(74) *Attorney, Agent, or Firm* — James B Carson

(57) ABSTRACT

The GURU-BRAHMA filter for purifying drinking water is a passive multi-stage multi-media filter for use in water purification. The GURU-BRAHMA filter for purifying drinking water removes harmful contaminants from a water stream including, but not limited to, toxic heavy metals and metalloids, pharmaceutical residues, microtoxins, endocrine disrupters, chlorinated and other halogenated solvents, fluoride, nitrate, and naturally occurring radioactive contaminants. The GURU-BRAHMA filter for purifying drinking water maintains concentrations of beneficial phyto-chemicals including, but not limited to flavonoids, phytosterols, tannins, polysaccharides, saponins, polyacetylenes, that provide many health benefits including natural cleansing of the blood and the liver and protection against the accumulation of bacteria, fungus, and viruses. Water processed through the GURU-BRAHMA filter for purifying drinking water meets United States, European Union and World Health Organization standards for safe drinking water. The GURU-BRAHMA filter for purifying drinking water comprises a filter housing and a plurality of filter modules.

6 Claims, 3 Drawing Sheets

(51) Int. Cl.
 *C02F 1/50* (2006.01)
 *C02F 101/12* (2006.01)
 *C02F 101/14* (2006.01)
 *C02F 101/16* (2006.01)
 *C02F 9/00* (2006.01)
 *C02F 101/10* (2006.01)
 *C02F 101/36* (2006.01)
 *C02F 101/00* (2006.01)
 *C02F 101/20* (2006.01)

(52) U.S. Cl.
 CPC .... *C02F 2101/20* (2013.01); *C02F 2101/363* (2013.01); *C02F 2101/366* (2013.01)

(56) References Cited

U.S. PATENT DOCUMENTS

| | | | |
|---|---|---|---|
| 5,561,167 | A | 10/1996 | Matsumoto |
| 8,057,682 | B2 | 11/2011 | Hoag |
| 8,454,986 | B2 | 6/2013 | De Windt |
| 8,802,161 | B2 | 8/2014 | Mazzio |
| 2003/0207003 | A1* | 11/2003 | Silver ................ C08B 37/0054 426/271 |
| 2005/0035062 | A1* | 2/2005 | Hiltzik ................ C01B 32/372 210/660 |
| 2007/0181511 | A1* | 8/2007 | Smith .................... C02F 1/001 210/792 |
| 2010/0316776 | A1* | 12/2010 | Miljkovic ................ C02F 1/70 426/271 |
| 2012/0189634 | A1 | 7/2012 | Hussain |
| 2015/0053620 | A1* | 2/2015 | Suri ........................ C02F 1/285 210/670 |

OTHER PUBLICATIONS

Desilva, Uranium Removal by Ion Exchange, May 2005, 11 pages [online], [retrieved on Oct. 17, 2017]. Retrieved from the internet <URL:https://www.wqpmag.com/uranium-removal-ion-exchange>.*

Desilva et al, Arsenic Removal by Regenerable Anion Resin, May 2008, 9 pages [online], [Retrieved on 17-20-2017]. Retrieved from the internet <URL: https://www.wqpmag.com/arsenic-removal-regenerable-anion-resin>.*

United States, Drinking Water Quality Standard, United States EPA 816-F-09-04. May 2009.

United States, Bottled Drinking Water Quality Standard, US 21CFR 165 110 (b).

World Health Organization, WHO Guidelines for Drinking Water Quality 4th Edition, 2011.

European Union, European Union Drinking Water Directive, Council Directive, 98/83/EC, Nov. 3, 1998.

Clement and Jarret, Antibacterial Silver, Metal-Based Drugs, 1994, vol. 1, Issue 5-6, pp. 467-482, Hindawi Publishing Corporation.

Bronson and Bronson, The Sulfur Containing Amion Acids: An Overview, Journal of Nutrition, Jun. 2006, vol. 136, No. 6, pp. 16365-16405, American Society for Nutrition.

Ferrecane, et al., Metabolic Profile of Bioactive Compounds of Burdock Seeds, Roots, and Leaves, J. Pharm and Biomedical Analysis, Jan. 2010, V51, I2, P399-404, Elsevier.

* cited by examiner

FILTER CONTAINING CLEANED BURDOCK ROOT FOR PURIFYING DRINKING WATER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of water filters, water purification and chemicals for water purification, more specifically, a filter configured for use in drinking water purification.

SUMMARY OF INVENTION

The GURU-BRAHMA filter for purifying drinking water is a passive multi-stage multi-media filter for use in water purification. The GURU-BRAHMA filter for purifying drinking water removes harmful contaminants from a water stream including, but not limited to, toxic heavy metals and metalloids, pharmaceutical residues, microtoxins, endocrine disrupters, chlorinated and other halogenated solvents, and naturally occurring radioactive contaminants. The GURU-BRAHMA filter for purifying drinking water simultaneously maintains concentrations of beneficial phyto-chemicals including, but not limited to flavonoids, phytosterols, tannins, polysaccharides, saponins, polyacetylenes, and keeps in close contact with metallic nano-particles of silver that provide many health benefits including natural cleansing of the blood and the liver and protection against the accumulation of bacteria, fungus, and viruses. Water processed through the GURU-BRAHMA filter for purifying drinking water meets United States, European Union and World Health Organization standards for safe drinking water.

These together with additional objects, features and advantages of the GURU-BRAHMA filter for purifying drinking water will be readily apparent to those of ordinary skill in the art upon reading the following detailed description of the presently preferred, but nonetheless illustrative, embodiments when taken in conjunction with the accompanying drawings.

In this respect, before explaining the current embodiments of the GURU-BRAHMA filter for purifying drinking water in detail, it is to be understood that the GURU-BRAHMA filter for purifying drinking water is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the GURU-BRAHMA filter for purifying drinking water.

It is therefore important that the claims be regarded as including such equivalent construction insofar as they do not depart from the spirit and scope of the GURU-BRAHMA filter for purifying drinking water. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
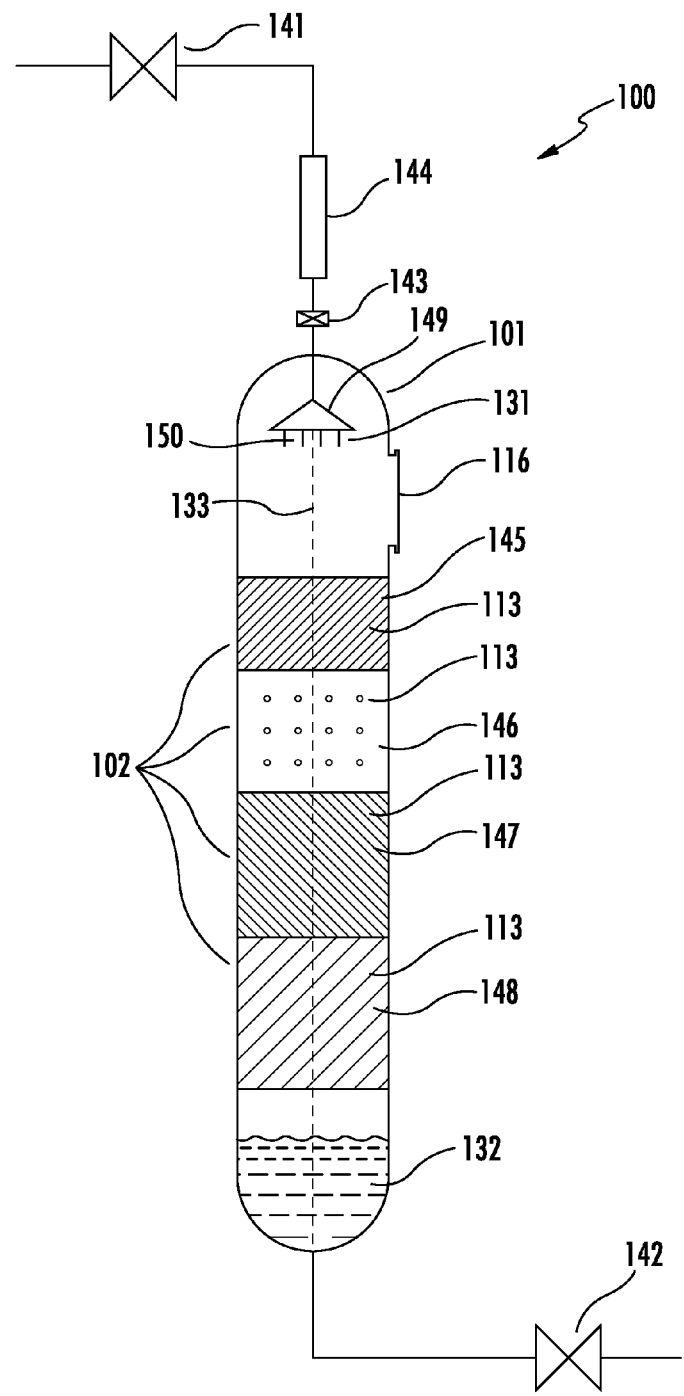
FIG. 1 is a front view of an embodiment of the disclosure.
Figure 2:
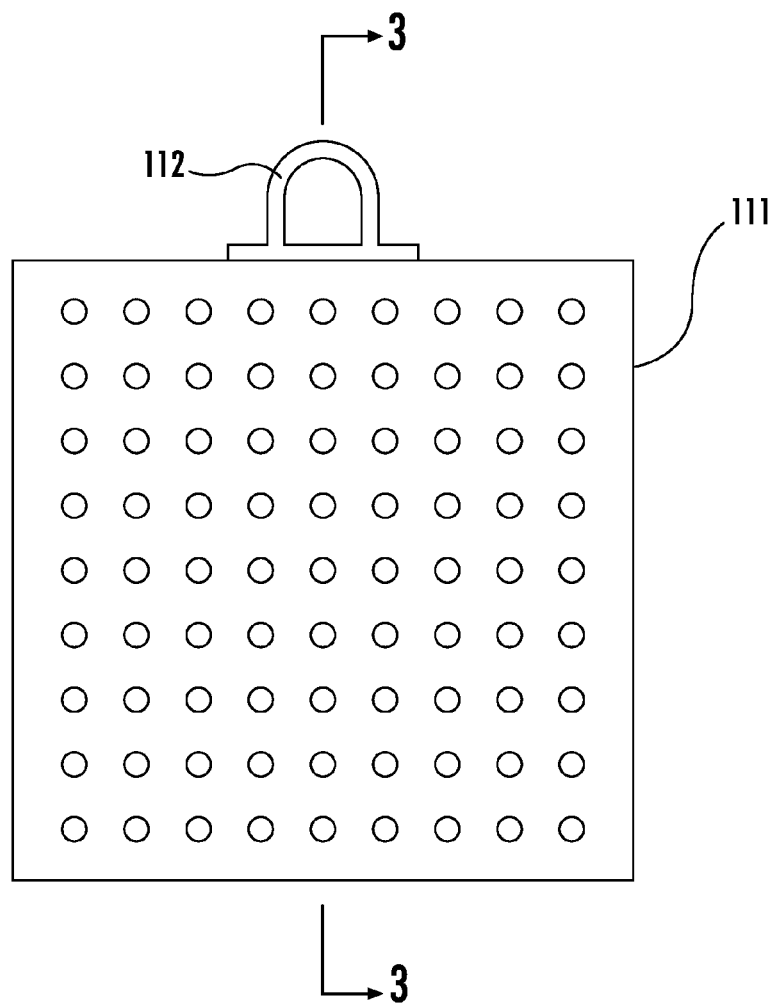
FIG. 2 is a detail view of one of the plurality of filter modules used in an embodiment of the disclosure.
Figure 3:
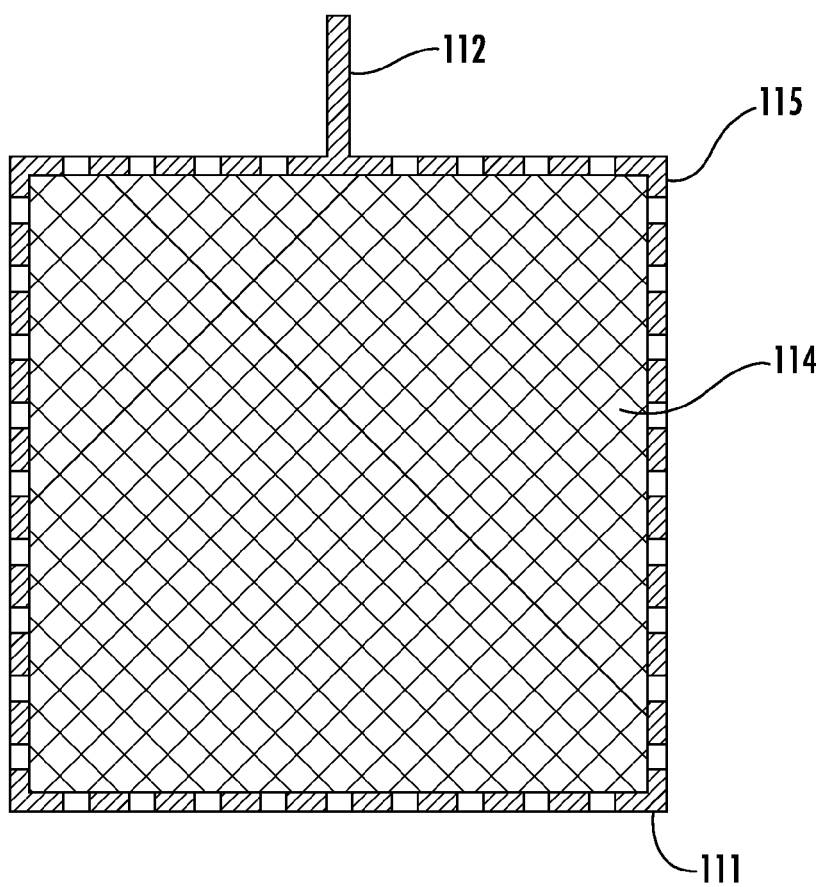
FIG. 3 is a cross-sectional view of one of the plurality of filter modules used in an embodiment of the disclosure across 3-3.

Detailed reference will now be made to a first potential embodiment of the disclosure, which is illustrated in FIGS. 1 through 3.

The water filter 100 (hereinafter invention) comprises a filter housing 101 and a plurality of filter modules 102.

The filter housing 101 is a column which contains the plurality of filter modules 102 and through which untreated water 131 is passed. Each of the plurality of filter modules 102 are stacked within the filter housing 101 such that that the untreated water 131 must pass through each of the plurality of filter modules 102 in order to pass through the filter housing 101. The purpose of each of the plurality of filter modules 102 is to remove contaminants from the untreated water 131 so that the treated water, hereinafter referred to as drinking water 132, is safe for human consumption. The filter housing 101 is further formed with an access port 116 that is used for the installation and replacement of the plurality of filter modules 102. The plurality of filter modules 102 are discussed elsewhere in this disclosure. The filter housing 101 can be made of several materials including, but not limited to, composite fiberglass, polycarbonate or polyacrylic.

It is explicitly acknowledged that the untreated water 131 can be mechanically pumped through the filter housing 101.

However, the specification and claims of this disclosure will hereinafter implicitly assume that the flow of untreated water 131 through filter housing 101 and the plurality of filter modules 102 will be due to gravitational forces. This is done for the purposes of simplicity and clarity of exposition of the disclosure is not intended to limit the scope of the disclosure or the appended claims. Those skilled in the art will recognize that the disclosure can be readily modified to accommodate mechanical pumps to pump untreated water 131 through the filter housing 101.

The purpose of the plurality of filter modules 102 is to remove contaminants from the untreated water 131 so that the drinking water 132, is safe for human consumption. As untreated water 131 flows through the filter housing 101, the invention 100 is able to remove the following contaminants: 1) toxic heavy metals and metalloids including, but not limited to, arsenic (As), mercury (Hg), cadmium (Cd), lead (Pb), copper (Cu) and zinc (Zn); 2) pharmaceutical residues, micro-toxins and endocrine disrupters including, but not limited to, PCBs, DDT, Dioxin, Bis-Phenol, Bis-Phthalate; 3) chlorinated and other halogenated solvents including, but not limited to, trichloroethylene and perchloroethylene (tetrachloroethylene); 4) naturally occurring radioactive contaminants including, but not limited to, uranium (U) and radium (Ra); and, 5) other contaminants including, but not limited to, fluoride (F) and nitrate (NO3).

While removing the above contaminants, the plurality of filter modules 102 also release beneficial phyto-chemicals including, but not limited to, flavanoids, phytosterols, tannins, polysaccharides, saponins and polyacetylenes that provide many health benefits including natural cleansing and detoxification for the blood and the liver. Some of these phyto-chemicals along with nano particles of embedded silver (Ag) provide protection against accumulation of bacteria, fungus, virus, microbes and prevent inflammation of cells and tissues.

Each of the plurality of filter modules 102 further comprises a cancellated package 111, a lifting lug 112 and an individual filtering medium 114 selected from a plurality of filtering mediums 113. The cancellated package 111 is a textile 115 structure that is used to contain an individual filtering medium 114. The textile 115 used to create the cancellated package 111 is designed with a mesh that allows water to pass through the textile 115 while containing the individual filtering medium 114 contained within the cancellated package 111. The cancellated package 111 has attached to it a lifting lug 112. The lifting lug 112 is a commercially available webbing that is used to form a handle that can be used to carry and position the cancellated package 111 within the filter housing 101. The individual filtering medium is a composition of matter that interacts with the untreated water 131 as it passes through the filter housing 131 to remove specific contaminants and release phyto-chemicals as well as to keep the untreated water 131 in close contact with embedded nano particles of silver (Ag). In the first potential embodiment of the disclosure, the textile 115 is a 50 mesh polypropylene fabric structured in the form of a simple sack. The lifting lug 112 is sewn directly onto the polypropylene fabric. The plurality of filtering mediums 113 are discussed elsewhere in this disclosure.

The shape of each of the plurality of filter modules 102 is designed to completely cover the cross-section of the filter housing 101 when the cross-section is cut at a right angle relative to the primary axis 133 of the filter housing 101. The inner diameter of the filter housing 101 is selected such that at normal flow of operation the pressure drop across the plurality of filter modules 102 does not exceed 4 psi.

The plurality of filtering mediums 113 further comprises cleaned burdock roots, nano silver embedded activated carbon, nano silver embedded natural zeolite, and nano silver embedded activated bone char. Each of these filtering mediums are discussed below.

Cleaned burdock root (hereinafter CBR) are the chopped and cleaned roots of the burdock plant having particle size range of 3.0 mm to 4.5 mm. The primary composition (up to 50%) of the burdock root is inulin. Inulin is a polysaccharide having a molecular formula of $C_{228}H_{382}O_{191}$. Inulin boosts the immune system and eliminates bacterial pathogens. Inulin is a scavenger for micro toxins and heavy metals such as mercury (Hg), cadmium (Cd), and arsenic (As). Besides inulin, the Burdock root contains several flavanoid anti-oxidants, tannins and a polyacetylene name arctiin ($C_{27}H_{34}O_{11}$). Arctiin is an anti-viral and anti-inflammatory agent. Micro toxins and the toxic heavy metals (As, Hg, Cd) are removed from the untreated water 131 through contact with the CBR. CBR removes some pharmaceutical residues as well. CBR releases several phyto-chemicals that prevent the accumulation of bacteria, virus, or pathogens and enriches the water to boost the immune system and the ability to fight inflammation. Some of the phyto-chemicals contained within the CBR are highly reactive with oxidizing agents. This high reactivity causes the phyto-chemicals contained with the CBR to scavenge for oxidizing agents that would otherwise oxidize the nano particles of embedded silver (Ag). This helps to keep the nano particles of embedded silver (Ag) in a reduced state and improves the effectiveness of the nano particles of embedded silver (Ag) in providing protection against accumulation of bacteria, fungus, virus, microbes and preventing inflammation of cells and tissues.

Nano silver embedded activated carbon (hereinafter NSEAC) is an engineered media. The preparation of NSEAC is discussed elsewhere in this disclosure. The NSEAC is granular in structure with an average particle size range between 15 to 20 mesh. The NSEAC filter media will capture the endocrine disrupters, the chlorinated and other halogenated solvents, and naturally occurring radium (Ra) from the untreated water. The NSEAC will also remove the remaining levels of pharmaceutical compounds and micro toxins that are not captured up by the CBR. The presence of metallic nano silver in the NSEAC is a second measure that prevents the accumulation of bacteria, virus, or pathogens within the invention 100 and the drinking water 132.

Nano silver embedded natural zeolite (hereinafter NSENZ) is an engineered media. The preparation of NSENZ is discussed elsewhere in this disclosure. The NSENZ has an average particle size range between 15 to 20 mesh. Chabazite, Mordenite, or Clinoptilolite are the preferred choices as the natural zeolite substrate. The NSENZ filter media will remove lead (Pb), copper (Cu) and zinc (Zn) contamination from the water stream. The presence of metallic nano silver in the NSENZ is an additional measure that prevents the accumulation of bacteria, virus, or pathogens within the invention 100 and the drinking water 132.

Nano silver embedded activated bone char (hereinafter NSEBC) is an engineered media. The preparation of NSEBC is discussed elsewhere in this disclosure. The NSEBC has an average particle size of between 15 to 20 mesh. The NSEBC filter media removes contaminants such as uranium (U), fluoride (F), and nitrate (NO3) from the untreated water stream 131. The NSEBC will also remove the remaining levels of any trace quantities of arsenic (As), cadmium (Cd), and mercury (Hg) that were not removed by the CBR.

Untreated water that is treated by the plurality of filtering mediums 113 described above will be free from all contaminants and will meet the primary drinking water standards defined by the United States Environmental Protection Agency, the World Health Organization, and the European Union and which are specifically described elsewhere in this disclosure.

The order of the plurality of filtering mediums 113 through which the untreated water 131 flows does not impact the effectiveness of the water treatment. The selection of the individual filtering mediums 114 can be varied based on knowledge of the contamination contained in the untreated water 131. For example, if it is known that the untreated water does not contain unacceptable levels of lead (Pb), copper (Cu), or zinc (Zn) then a filter module containing NSENZ does not need to be selected for use in the invention 100. Similarly, if it is known that the untreated water contains unusually high levels of naturally occurring uranium (U), more than one filter module containing NSEBC can be used in the invention 100.

In the first potential embodiment of the disclosure, the invention 100 is assembled and operates as follows.

The plurality of filter modules 113 comprises a fifth CBR filter module 145, a sixth NSEAC filter module 146, a seventh NSENZ filter module 147, and an eighth NSEBC filter module 148. The access port 116 is opened and the plurality of filter modules 113 are placed into the filter housing in the following order: the eighth NSEBC filter module 148, the seventh NSENZ filter module 147, the sixth NSEAC filter module 146, and finally the fifth CBR filter module 145. The access port 116 is then closed.

Untreated water 131 flows through a first inlet valve 141 which feeds the untreated water 131 into a fourth in-line filter cartridge 144. The fourth in-line filter cartridge 144 is a 5 micron filter that removes particulates from the untreated water 131. The untreated water 131 then flows through a third isolation valve 143. The purpose of the third isolation valve 143 is to provide a way to shut off water flow between the fourth in-line filter cartridge 144 and the filter housing 101 so that the fourth in-line filter cartridge 144 can be replaced. The untreated water 131 then flows into the filter housing 101 and through a ninth spray nozzle 149. The purpose of the ninth spray nozzle 149 is to distribute the untreated water 131 in a tenth water spray 150 evenly across the cross-section of the filter housing 101 as described above. The untreated water 131 then flows through the plurality of filter modules 102 for processing. Drinking water 132 is withdrawn from the filter housing through a second outlet valve 142.

The preferred method for the preparation of 1 kilogram of the NSEAC filter media is a bio-reduction method described below.

1) Prepare 1.5 lit of 1 Molar silver nitrate (AgNO3) solution by dissolving 1.5 gm-mole (255 gm) of AgNO3 in 1.5 liters of potable water. Keep the solution covered and away from sunlight.

2) Take 300 gm of clean organic chopped Burdock Root and add 1.5 liters of warm (65 C) potable water. Stir well and soak the roots for 4 hours. Filter the contents to remove the roots. Cover the burdock root extract and set it aside.

3) Place 1 Kg of granular activated carbon (particle size 15 to 20 mesh) in a 5 gal tumbler.

4) Add 1.5 liters of 1 Molar AgNO3 solution to the tumbler and tumble for 60 minutes at low speed;

5) Add 1.5 liters burdock root extract and tumble for 3 hours at low speed.

6) Keep the contents of the tumbler covered and allow it to sit for 20 to 24 hours in absence of light.

7) Changes in the color of the fluid inside the tumbler will indicate bio-reduction of AgNO3 to nano silver particles embedded within the structure of the activated carbon matrix.

8) Samples of embedded carbon can be drawn from the tumbler, monitored and measured using an ultraviolet visible spectrophotometer.

9) Following bio-reduction and confirmation for deposition of the nano particles, the contents of the tumbler (NSEAC) is drained from the liquids and washed 3 times with de-ionized water.

10) The washed NSEAC is dried under vacuum to remove the moisture.

11) Depending on the size and uniformity of the embedded nano particles, the steps for synthesis may have to be repeated to obtain the desired product.

The methodology described above will produce silver nano particles in the size range of 1 to 5 nm (nano meter). The size of the nano particles can be altered by varying the strength of the burdock root extract. UV spectrophotometer measurements will confirm that the nano particles of silver have been embedded within the matrix of the activated carbon.

The preferred method for the preparation of 1 kilogram of the NSENZ filter media is a bio-reduction method described below.

1) Prepare 1.5 lit of 1 Molar silver nitrate (AgNO3) solution by dissolving 1.5 gm-mole (255 gm) of AgNO3 in 1.5 liters of potable water. Keep the solution covered and away from sunlight.

2) Take 300 gm of clean organic chopped Burdock Root and add 1.5 liters of warm (65 C) potable water. Stir well and soak the roots for 4 hours. Filter the contents to remove the roots. Cover the burdock root extract and set it aside.

3) Place 1 Kg of natural zeolite (particle size 15 to 20 mesh) in a 5 gal tumbler.

4) Add 1.5 liters of 1 Molar AgNO3 solution to the tumbler and tumble for 60 minutes at low speed.

5) Add 1.5 liters burdock root extract and tumble for 3 hours at low speed.

6) Keep the contents of the tumbler covered and allow it to sit for 20 to 24 hours in absence of light;

7) Changes in the color of the fluid inside the tumbler will indicate bio-reduction of AgNO3 to nano silver particles embedded within the structure of the natural zeolite.

8) Samples of natural zeolite can be drawn from the tumbler, monitored and measured using an ultraviolet visible spectrophotometer.

9) Following bio-reduction and confirmation for deposition of the nano particles, the contents of the tumbler (NSENZ) is drained from the liquids and washed 3 times with de-ionized water.

10) The washed NSENZ is dried under vacuum to remove the moisture.

11) Depending on the size and uniformity of the embedded nano particles, the steps for synthesis may have to be repeated to obtain the desired product.

The methodology described above will produce silver nano particles in the size range of 1 to 5 nm (nano meter). The size of the nano particles can be altered by varying the strength of the burdock root extract. UV spectrophotometer measurements will confirm that the nano particles of silver have been embedded within the matrix of the natural zeolite.

The preferred method for the preparation of 1 kilogram of the NSEBC filter media is a bio-reduction method described below.

1) Prepare 1.5 lit of 1 Molar silver nitrate (AgNO3) solution by dissolving 1.5 gm-mole (255 gm) of AgNO3 in 1.5 liters of potable water. Keep the solution covered and away from sunlight.

2) Take 300 gm of clean organic chopped Burdock Root and add 1.5 liters of warm (65 C) potable water. Stir well and soak the roots for 4 hours. Filter the contents to remove the roots. Cover the burdock root extract and set it aside.

3) Place 1 Kg of activated bone char (particle size 15 to 20 mesh) in a 5 gal tumbler.

4) Add 1.5 liters of 1 Molar AgNO3 solution to the tumbler and tumble for 60 minutes at low speed.

5) Add 1.5 liters burdock root extract and tumble for 3 hours at low speed.

6) Keep the contents of the tumbler covered and allow it to sit for 20 to 24 hours in absence of light.

7) Changes in the color of the fluid inside the tumbler will indicate bio-reduction of AgNO3 to nano silver particles embedded within the structure of the activated bone char.

8) Samples of natural zeolite can be drawn from the tumbler, monitored and measured using an ultraviolet visible spectrophotometer.

9) Following bio-reduction and confirmation for deposition of the nano particles, the contents of the tumbler (NSEBC) is drained from the liquids and washed 3 times with de-ionized water.

10) The washed NSEBC is dried under vacuum to remove the moisture.

11) Depending on the size and uniformity of the embedded nano particles, the steps for synthesis may have to be repeated to obtain the desired product.

The methodology described above will produce silver nano particles in the size range of 1 to 5 nm (nano meter). The size of the nano particles can be altered by varying the strength of the burdock root extract. UV spectrophotometer measurements will confirm that the nano particles of silver have been embedded within the matrix of the activated bone char.

An alternate method for the preparation of 1 kg of NSEAC filter media is a pyrolysis (thermal reduction) method described below.

1) Prepare 2 liters of 1 Molar silver nitrate (AgNO3) solution by adding 2 gm-mole (340 gm) of AgNO3 in 2.0 liters of potable water. Cover the contents and keep it away from sunlight;

2) Take 2 gm-mole (584 gm) of ethylenediaminetetraacetic acid (EDTA) and dissolve in the 2.0 liter AgNO3 solution. EDTA will sequester the silver ions from the solution. As an alternative to EDTA, one can use other chelating agents including, but not limited to: NTA (nitrilotriacetic acid), or DTPA (diethylenetriaminepentaacetic acid)

3) Place 1 Kg of activated carbon (particle size 15 to 20 mesh) in a 5 gal tumbler.

4) Add the AgNO3-EDTA solution to the activated carbon and gently tumble for 3 hours.

5) Allow the activated carbon to settle at the bottom of the tumbler.

6) Drain the fluids from the top of the tumbler and wash the activated carbon 3 times with de-ionized water.

7) Drain the wash water and remove any excess fluid from the activated carbon.

8) Place the activated carbon in a rotary vacuum pyrolyzer and pyrolyze (thermally reduce) the contents for 2 hours at 300 C. The pyrolysis will break the chelating agent's structure and free the sequestered silver ion and embed it within the matrix of the activated carbon as nano particles of silver.

Samples of the activated carbon, following pyrolysis, must be analyzed using a UV visible spectrophotometer to measure the size of the silver nano particles and check the uniformity of distribution within the carbon matrix. Depending on the results of the analysis, the steps for synthesis may be repeated to obtain the desired NSEAC product.

An alternate method for the preparation of 1 kg of NSENZ filter media is a pyrolysis method described below.

1) Prepare 2 liters of 1 Molar silver nitrate (AgNO3) solution by adding 2 gm-mole (340 gm) of AgNO3 in 2.0 liters of potable water. Cover the contents and keep it away from sunlight;

2) Take 2 gm-mole (584 gm) of ethylenediaminetetraacetic acid (EDTA) and dissolve in the 2.0 liter AgNO3 solution. EDTA will sequester the silver ions from the solution. As an alternative to EDTA, one can use other chelating agents including, but not limited to: NTA (nitrilotriacetic acid), or DTPA (diethylenetriaminepentaacetic acid)

3) Place 1 Kg of natural zeolite (particle size 15 to 20 mesh) in a 5 gal tumbler;

4) Add the AgNO3-EDTA solution to the natural zeolite and gently tumble for 3 hours.

5) Allow the natural zeolite to settle at the bottom of the tumbler.

6) Drain the fluids from the top of the tumbler and wash the natural zeolite 3 times with de-ionized water.

7) Drain the wash water and remove any excess fluid from the natural zeolite.

8) Place the natural zeolite in a rotary vacuum pyrolyzer and pyrolyze the contents for 2 hours at 300 C. The pyrolysis will break the chelating agent's structure and free the sequestered silver ion and embed it within the matrix of the natural zeolite as nano particles of silver.

Samples of the natural zeolite, following pyrolysis, must be analyzed using a UV visible spectrophotometer to measure the size of the silver nano particles and check the uniformity of distribution within the natural zeolite. Depending on the results of the analysis, the steps for synthesis may be repeated to obtain the desired NSENZ product.

An alternate method for the preparation of 1 kg of NSEBC filter media is a pyrolysis method described below.

1) Prepare 2 liters of 1 Molar silver nitrate (AgNO3) solution by adding 2 gm-mole (340 gm) of AgNO3 in 2.0 liters of potable water. Cover the contents and keep it away from sunlight;

2) Take 2 gm-mole (584 gm) of ethylenediaminetetraacetic acid (EDTA) and dissolve in the 2.0 liter AgNO3 solution. EDTA will sequester the silver ions from the solution. As an alternative to EDTA, one can use other chelating agents including, but not limited to: NTA (nitrilotriacetic acid), or DTPA (diethylenetriaminepentaacetic acid)

3) Place 1 Kg of activated bone char (particle size 15 to 20 mesh) in a 5 gal tumbler;

4) Add the AgNO3-EDTA solution to the activated bone char and gently tumble for 3 hours.

5) Allow the activated bone char to settle at the bottom of the tumbler.

6) Drain the fluids from the top of the tumbler and wash the activated bone char 3 times with de-ionized water.

7) Drain the wash water and remove any excess fluid from the activated bone char.

8) Place the activated bone char in a rotary vacuum pyrolyzer and pyrolyze the contents for 2 hours at 300 C. The pyrolysis will break the chelating agent's structure and free the sequestered silver ion and embed it within the matrix of the activated bone char as nano particles of silver.

Samples of the activated bone char, following pyrolysis, must be analyzed using a UV visible spectrophotometer to measure the size of the silver nano particles and check the uniformity of distribution within the natural zeolite. Depending on the results of the analysis, the steps for synthesis may be repeated to obtain the desired NSEBC product.

Definitions and Directional References

The following definitions, acronyms and references were used in this disclosure:

Bone Char: As used in this disclosure, bone char is an activated material that is produced by charring, usually through pyrolysis, animal bones. The bone char thereafter is activated by the injection of steam and oxygen.

Burdock: As used in this disclosure, burdock is a perennial plant found in the United States, China, and Europe Cancellated: As used in this disclosure, cancellated is used as an adjective to describe a sponge like, net like, or screen like structure.

CBR: As used in this disclosure, CBR is an acronym for chopped burdock root.

Column: As used in this disclosure, a column is a hollow device that is used for processing and transporting liquids and gasses.

Cross-section: As used in this disclosure, a cross-section is a surface or shape that would be exposed by making a straight cut through an object.

DTPA: As used in this disclosure, DTPA is an acronym for diethylenetriaminepentaacetic acid.

Drinking Water: As used in this disclosure, drinking water is water that is deemed safe for drinking or use in cooking. A synonym is potable water.

EDTA: As used in this disclosure, EDTA is an acronym for ethylenediaminetetraacetic acid.

Inner Diameter: As used in this disclosure, the term inner diameter is used in the same way that a plumber would refer to the inner diameter of a pipe.

Mesh: As used in this disclosure, the term mesh refers to a measure of the size of particle a screen or sieve will pass. Specifically, mesh refers to the number of holes per liner inch of the screen or sieve surface. For example, a sieve surface with ten holes per linear inch is referred to as 10 mesh. A ten mesh screen or sieve surface will have on average 100 holes per square inch.

NSEAC: As used in this disclosure, NSEAC is an acronym for nano silver embedded activated carbon.

NSEBC: As used in this disclosure, NSEBC is an acronym for nano silver embedded activated bone char.

NSENZ: As used in this disclosure, NSENZ is an acronym for nano silver embedded natural zeolite.

NTA: As used in this disclosure, NTA is an acronym for nitrilotriacetic acid.

Untreated Water: As used in this disclosure, untreated water is water that has not been completely processed by the invention described in this disclosure.

Webbing: As used in this disclosure, a webbing is strong, close woven fabric that is used for straps or belting.

Zeolite: As used in this disclosure, a zeolite is any of a group of anhydrous aluminum silicate, or their corresponding synthetic compounds, that are used as molecular filters and ion exchange agents The following drinking water quality standards are referenced in this disclosure:

United States Drinking Water Quality Standard: United States EPA 816-F-09-004. May 2009

United States Bottled Drinking Water Quality Standard: US 21 CFR 165 110 (b) Apr. 1, 2013.

World Health Organization Drinking Water Quality Standard: WHO Guidelines for Drinking Water Quality 4th Edition, 2011.

European Union Drinking Water Quality Standard: European Union Drinking Water Directive Council Directive 98/83/EC Nov. 3, 1998.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A water filter comprising:
   a column having an upper end and a lower end;
   an inlet for directing untreated water into the upper end of the column;
   an outlet for directing treated water out of the bottom end of the column;
   a first filter module disposed within the column adjacent the inlet, wherein said first filter module contains chopped burdock root; and
   a second filter module disposed within the column below said first module, wherein said second module contains activated carbon having nanoparticles of silver embedded therein.

2. A water filter according to claim 1, wherein each said filter module is enclosed in a fabric sack.

3. The water filter according to claim 1, further comprising a third filter module disposed within the column below said second module, wherein said third filter module contains a natural zeolite having nanoparticles of silver embedded therein.

4. The water filter according to claim 3, wherein each said filter module is enclosed in a fabric sack.

5. The water filter according to claim 3, further comprising a fourth filter module disposed within the column below said third filter module, wherein said fourth filter module contains activated bone char having nanoparticles of silver embedded therein.

6. A water filter according to claim 5, wherein each said filter module is enclosed in a fabric sack.

* * * * *